United States Patent Office.

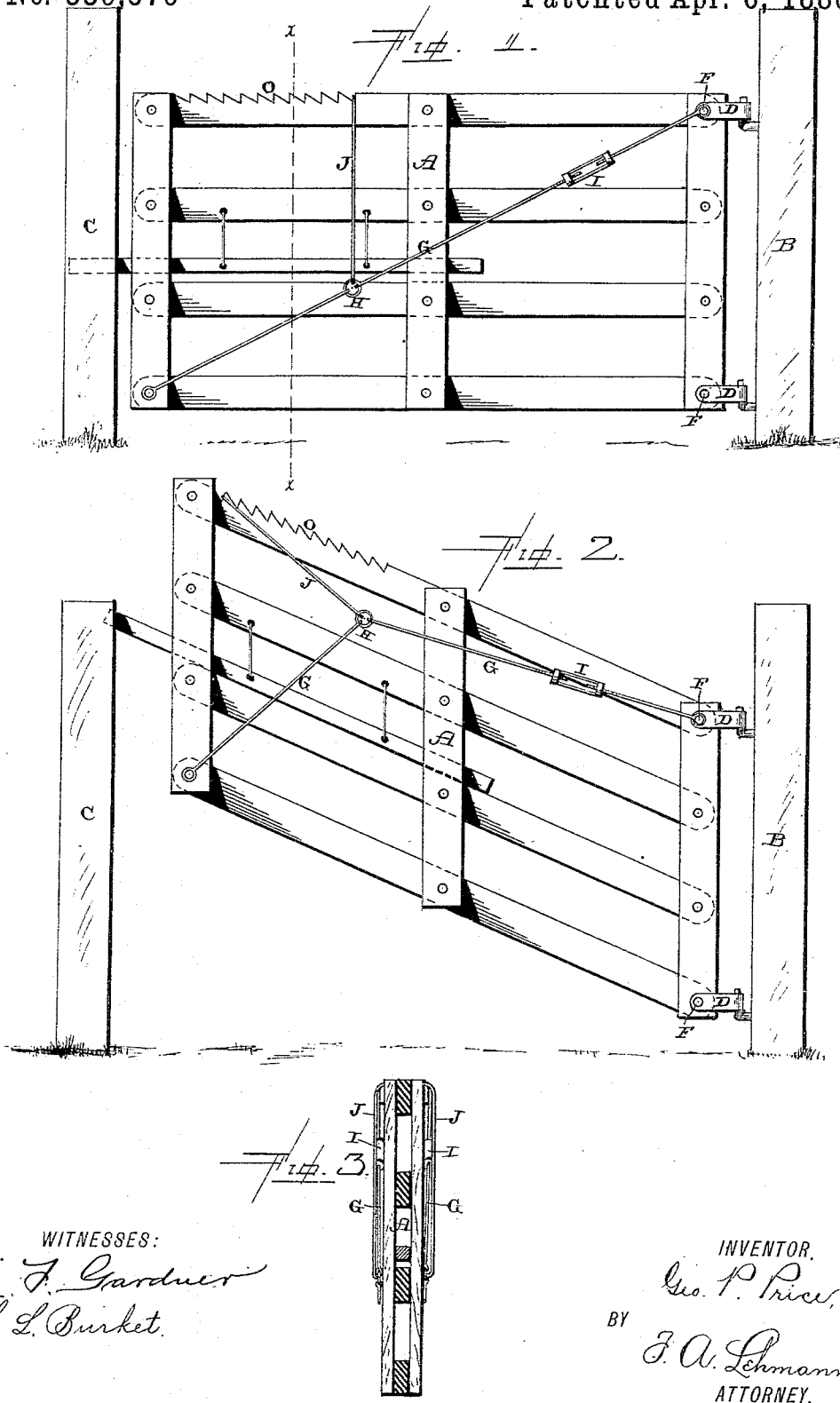

GEORGE P. PRICE, OF CARLISLE, OHIO.

GATE.

SPECIFICATION forming part of Letters Patent No. 339,579, dated April 6, 1886.

Application filed January 11, 1886. Serial No. 188,221. (No model.)

*To all whom it may concern:*

Be it known that I, GEORGE P. PRICE, of Carlisle, in the county of Warren and State of Ohio, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates; and it consists in, first, the combination of the gate with the diagonal brace-rods, which are applied to opposite sides of the gate and jointed together at any suitable point, and the rod which passes up over the top of the gate and catches in notches or over stops, whereby the gate can be held in any desired position at its outer free end; second, the arrangement and combination of parts, which will be more fully described hereinafter.

The object of my invention is to provide a gate with brace-rods, which are applied to opposite sides, and which rods are made in two parts, so that a tightening-rod, which is applied to the brace-rods at their joints, can be made to take up all sag in the gate, and the gate held in a suspended position at one end, so that small stock may pass freely under it, and so that the gate may be opened and closed over snow-drifts.

Figure 1 is a side elevation of a gate embodying my invention, showing the gate in a horizontal position. Fig. 2 is a similar view showing the gate in a raised position. Fig. 3 is a vertical section of the gate, taken upon the line *x x* of Fig. 1.

A represents an ordinary farm-gate; B, the post to which it is hinged; C, the post against which the gate closes, and D the hinges. Those portions of the hinges which are attached directly to the gate are made from single pieces of metal, and are secured to the gate by means of the bolts F.

The different parts of the gate are hinged together, in the usual manner, so that the gate may be kept either in a horizontal position, as shown in Fig. 1, or have its free end raised upward, as shown in Fig. 2, so that it can be readily opened over snow-drifts, or so that small animals can readily pass under it from one field to the other without allowing the large animals to pass through. Applied to opposite sides of this gate are the two brace-rods G, each one of which is made in three separate and distinct pieces. The lower and middle pieces are connected together at their inner ends by means of the rings H, which form flexible joints in the rods, so that they can be raised upward, as shown in Fig. 2, when it is desired to hold the free end of the gate in a raised position, as shown in Fig. 2. The middle and upper portions of the rods are connected together by a turn-buckle, I, or any other equivalent fastening device, by means of which the rods can be shortened or lengthened at will, either for the purpose of making the rods upon opposite sides of the gate exactly the same length or for the purpose of shortening the rods to take up any sag in the free end of the gate. In case the rods G are not exactly of the same length, all the weight of the gate comes upon a single rod alone, instead of being distributed equally over them both. These rods G extend diagonally across the gate, and are secured in position at their upper ends by means of the bolt F, which passes through and secures the hinge to the gate.

Connected to the two rings H, which connect two of the parts of the rods G together, is a tightening-rod, J, which passes up over the top of the gate, and which catches in the notches O, which are made in the top edge of the top panel, as shown. These notches O will be protected from wear and injury in any suitable manner. When it is desired to raise the free end of the gate upward, as shown in Fig. 2, it is only necessary to force the upper end of the rod J forward in the notches O in proportion to the height that it is desired to raise the end of the gate. In proportion as the free end of the gate is raised upward the rods G are deflected from a straight line, and the upper end of the rod J is moved forward toward the outer end of the gate. The upper ends of the rods G being fastened directly to the hinged bolt F the whole weight of the gate is brought to bear immediately upon the hinge, and thus the gate is much less likely to sag than if the upper ends of the rods G were connected directly to the gate itself.

Having thus described my invention, I claim—

1. The combination of the gate, the two brace-rods which are connected to opposite corners of the gate and which are loosely connected at their inner ends, and the U-shaped tightening-rod which passes up over the top edge of the gate and engages with notches which are formed in the top edge of the top bar of the gate, substantially as shown.

2. The combination of the gate, the diagonal brace-rods G, which are connected together by means of the rings H, and the tightening-rod J, which passes up over the edge of the gate and catches in the notches O, substantially as described.

In testimony whereof I affix my signature in presence of two witnesses.

GEORGE P. PRICE.

Witnesses:
J. M. DACHTLER,
E. J. SWINK.